N. G. GOREAU.
PLUMBING FITTING.
APPLICATION FILED APR. 20, 1906.
914,944.
Patented Mar. 9, 1909.
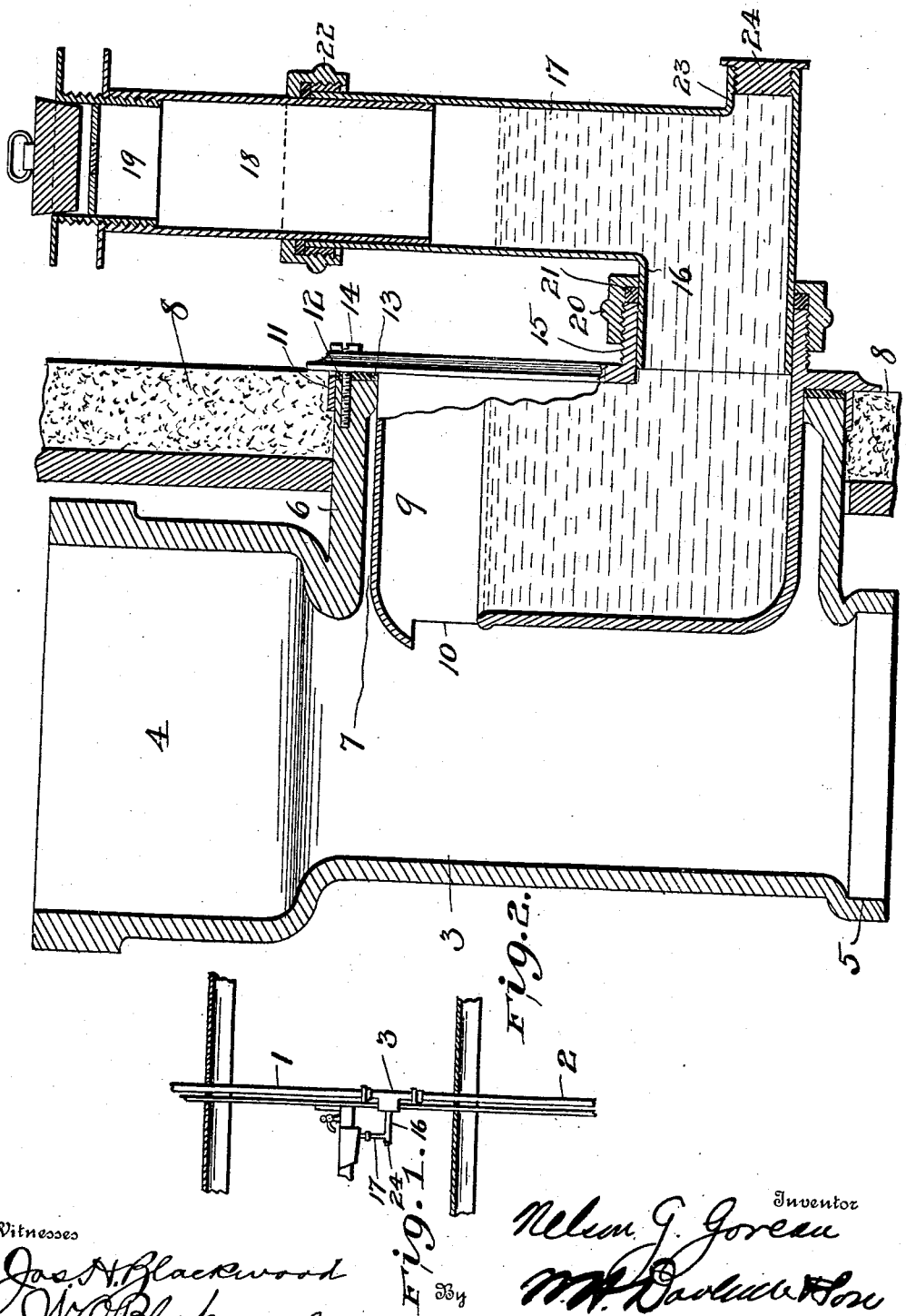

UNITED STATES PATENT OFFICE.

NELSON G. GOREAU, OF NEW ORLEANS, LOUISIANA.

PLUMBING-FITTING.

No. 914,944.  Specification of Letters Patent.  Patented March 9, 1909.

Application filed April 20, 1906. Serial No. 312,862.

*To all whom it may concern:*

Be it known that I, NELSON G. GOREAU, a citizen of the United States, residing at New Orleans, in the parish of Orleans and State of Louisiana, have invented certain new and useful Improvements in Plumbing-Fittings, of which the following is a specification.

My invention relates to plumbing fittings and its principal object is to provide a fitting adapted to combine in a single fitting a connection between the wash-stand, or other fixture and both the waste and vent pipes, a trap and means to examine both said trap and the vent and waste pipes without the necessity of cutting through the wall to obtain access to the pipes.

Other objects are to obtain a water seal such as will effectually prevent the entrance of gases through the outlet pipe, and to provide a fitting of such construction and capable of such application with respect to the pipes and wall that a great saving in expense in making and in applying such fitting is obtained.

To these ends my invention is embodied in preferable form, in the construction herein described and illustrated in the accompanying drawings.

In these drawings, Figure 1 is a side view in elevation showing my improved fitting applied to a wash-stand and the pipes leading therefrom, and Fig. 2, is a central vertical section of the fitting.

Referring to the drawings, 1 is the ordinary vent pipe and 2 the waste pipe. Adapted to connect the vent and waste pipes is a pipe section 3, which forms the main body of the fitting. This pipe section may be provided at its upper end with a socket hub 4 and at its lower end with a spigot connection 5. The pipe section is also provided with an open projection or angle-section 6, forming a chamber 7, and adapted to project from the pipe through the wall of the building. Extending within this projection is the body of a trap 9, having an outlet opening 10, of limited area at its upper end, which communicates with the pipe section 3. The trap has a lateral flange 11, which fits over the projecting section 6, and a vertical flange 12, extending over the front edge of the said section and also bearing against the outer surface of the wall. The flange 12 forms an outside face plate for the pipe fitting and constitutes a removable closure for the pipe section 3. A rubber gasket 13, is interposed between said flange 12 and the face of said angle-section to obtain a tight packing of the joint and screws 14 serve to removably secure the body of the trap to the pipe section.

At its lower end and extending from its outer side the trap is provided with an elbow 15, adapted to receive the elbow extension 16 of an outlet connecting pipe 17, which communicates with the outlet pipe 18 leading from the wash-stand or other fixture and provided with the usual basin plug connection 19. The elbows 15, 16 are joined by the threaded collar 20 and compressible gasket 21, interposed between said collar and the end of elbow 15. A similar joint 22 connects pipes 17 and 18. In the wall of pipe 17, opposite the opening of the elbow 15 of the trap is an opening 23, closed by a trap screw 24.

With the arrangement above described, it will be seen that by removing the trap screw 24, access is readily afforded to the trap to clean the same.

By means of the extension of the main body 3 of the fitting through the wall and the detachable engagement therewith on the exterior of the wall of the combined trap and cleaning attachment, the latter parts may be readily removed, and direct access afforded not only to the waste pipe but also to the vent pipe, whereby any stoppage in the latter pipe may be ascertained and removed, which is an operation that cannot be obtained with the ordinary fitting employed. The trap being entirely removed from the wall it can be readily examined and cleaned and easily repaired or replaced.

The form of trap herein disclosed also gives a very deep water seal, which serves to prevent sewer gases from entering the room through outlet pipe 17, while the trap is so close to the vent pipe that siphonic action of the water will not break the water seal in the trap.

With such a construction of fitting not only will the ordinary S-trap with its accompanying pipe and fittings be done away with, but the labor of installation will be greatly lessened and hence the expense of the fitting decreased.

Various changes in the modes of connections of the pipes and other details of construction may be made without departing from the principle of my invention.

Having thus described the preferred embodiment of my invention, what I claim is:

1. A plumbing fitting comprising a pipe section fixed in place outside a partition, and having a lateral member extending through and terminating approximately flush with the inner surface of the partition, and a trap body within the lateral member.

2. A plumbing fitting comprising a pipe section fixed in place outside a partition, and having a lateral member extending through and terminating approximately flush with the inner surface of the partition, and a trap body secured within the lateral member and removable from the inside of the partition.

3. A plumbing fitting comprising a fixed pipe section having a lateral member terminating approximately flush with the inner face of a partition, a trap body normally secured within the lateral member by means of a flange which forms a closure for the pipe section, said body being removable from the pipe section from the side of the partition opposite the pipe fitting.

4. In a plumbing fitting, the combination of a pipe section having connections for vent and soil pipes, a lateral branch communicating with the section, a trap body within the branch, and a flange on the body lying against the end of the branch forming a closure therefor and by which the body is secured in place.

5. In a plumbing fitting, the combination of a pipe section having connections for vent and soil pipes, a lateral branch which is inserted in a hole in a partition with its end substantially flush with the inner surface thereof, a trap body located within the branch and having an outlet near its top within the pipe section, a flange on the body forming a closure for the branch secured to the end thereof by suitable means and serving to retain the body in position, an elbowed outlet connection secured to the trap body near the bottom, a cleaning opening in the outlet connection by which access can be had to the trap body, and a suitable closure for the opening.

6. The combination with a fitting provided with an extension adapted to pass through a wall or partition, of a trap removably secured within the extension.

7. The combination with a fitting having connections for vent and soil pipes and provided with an extension adapted to pass through a wall or partition, of a trap removably secured within the extension.

8. The combination with a fitting having connections for vent and soil pipes and a branch extending through a partition, of a removable trap within the fitting, consisting of a bowl having an overflow near the top, and a flange on the trap forming a closure for the branch and serving to secure the trap in position.

9. The combination with a fitting having connections for vent and soil pipes and a branch extending through a partition, of a removable trap within the fitting, consisting of a bowl having an overflow near the top, a flange on the trap forming a closure for the branch and serving to secure the trap in position, and an elbowed outlet connection communicating with the trap.

10. The combination with a fitting having connections for vent and soil pipes and a branch extending through a partition, of a removable trap within the branch, and a cleaning opening communicating with the trap.

11. The combination with a fitting having connections for vent and soil pipes and a branch extending through a partition, of a removable trap within the branch, and an elbowed outlet connection communicating with the trap.

12. The combination with a fitting having connections for vent and soil pipes and a branch extending through a partition, of a removable trap within the branch, a cleaning opening communicating with the trap near the bottom by means of which the trap may be drained and cleaned while it is in position.

13. The combination with a fitting having connections for vent and soil pipes, and a branch extending through a partition, of a removable trap within the fitting, a flange on the trap forming a closure for the branch and serving to secure the trap in position, an elbowed outlet connection communicating with the trap, and a cleaning opening in the elbow communicating with the trap near the bottom, by means of which the trap may be drained and cleaned while it is in position.

14. A plumbing fitting, consisting of a pipe adapted to be connected to vent and waste pipes, and having a lateral, substantially horizontal extension containing a trap.

15. A plumbing fitting comprising a pipe member adapted to be connected with a vent pipe at one end and a waste pipe at the other end, and a lateral, substantially horizontal extension communicating with the pipe member and containing a trap.

16. A plumbing fitting comprising a pipe member adapted to be connected with a vent pipe at one end and a waste pipe at the other end, a straight passage between the waste and vent pipes, and a lateral extension adapted to extend through a partition and communicating with the pipe member and containing a trap.

17. A plumbing fitting comprising a pipe member adapted to be connected with a vent pipe at one end and a waste pipe at the other end, a direct passage between the waste and vent pipes, and a lateral extension adapted to extend through a partition and communicating with the pipe member and containing a trap.

18. A plumbing fitting comprising a pipe member adapted to be connected with a vent pipe at one end and a waste pipe at the other end, a lateral extension thereof adapted to extend through a partition, and a trap inclosed in said extension.

19. A plumbing fitting comprising a pipe member adapted to be connected with a vent pipe at one end and a waste pipe at the other end, a lateral extension thereof adapted to extend through a partition, and a trap inclosed in said extension so as to lie entirely outside the passage provided by the pipe member between the vent and waste pipes.

20. A plumbing fitting comprising a pipe member adapted to be connected with vent and waste pipes, a lateral extension thereof adapted to extend through a partition, and a trap inclosed in the extension and provided with a cleaning opening accessible from within the apartment for cleaning the trap.

In testimony whereof I have signed my name to this specification in the presence of two subscribing witnesses.

NELSON G. GOREAU.

Witnesses:
  P. SHUTTLES,
  ALBERT ESCARRAGUELL.